US011270736B2

(12) United States Patent
Li et al.

(10) Patent No.: US 11,270,736 B2
(45) Date of Patent: Mar. 8, 2022

(54) VIDEO DATA PROCESSING METHOD, DEVICE, SYSTEM, AND STORAGE MEDIUM (71) Applicant: SZ DJI TECHNOLOGY CO., LTD., Shenzhen (CN)

(72) Inventors: Xinyu Li, Shenzhen (CN); Chengyi Xiao, Shenzhen (CN); Zengxiong Yang, Shenzhen (CN); Qiheng Song, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/915,137

(22) Filed: Jun. 29, 2020

(65) Prior Publication Data
US 2020/0335135 A1 Oct. 22, 2020

Related U.S. Application Data (63) Continuation of application No. PCT/CN2017/119751, filed on Dec. 29, 2017.

(51) Int. Cl.
G11B 27/031 (2006.01)
G06K 9/00 (2022.01)
(Continued)

(52) U.S. Cl.
CPC ........ G11B 27/031 (2013.01); G06K 9/00255 (2013.01); G06K 9/00302 (2013.01);
(Continued)

(58) Field of Classification Search
CPC ....... G11B 27/031; G11B 27/13; G11B 27/34; G06K 9/00255; G06K 9/00302; G10L 17/26; H04N 5/77
See application file for complete search history.

(56) References Cited

U.S. PATENT DOCUMENTS 10,546,441 B2 * 1/2020 Joao .................... G07C 9/00896
2009/0103898 A1 4/2009 Morioka et al.
(Continued)

FOREIGN PATENT DOCUMENTS

CN 101356800 A 1/2009
CN 102176731 A 9/2011
(Continued)

OTHER PUBLICATIONS

The World Intellectual Property Organization (WIPO) International Search Report for PCT/CN2017/119751 dated Sep. 11, 2018 9 pages.

(Continued)

Primary Examiner — Mishawn N. Hunter
(74) Attorney, Agent, or Firm — Anova Law Group, PLLC (57) ABSTRACT A video data processing method includes identifying target video data, determining a target time period of the target video data, clipping a video data segment within the target time period from the target video data, and obtaining clipped video data according to the video data segment. The target time period is set according to shooting state information associated with the target video data. The shooting state information includes at least one of motion state information during shooting of the target video data or state information of a target object detected during shooting of the target video data.

17 Claims, 4 Drawing Sheets (51) Int. Cl.
*G10L 17/26* (2013.01)
*G11B 27/13* (2006.01)
*G11B 27/34* (2006.01)
*H04N 5/77* (2006.01)

(52) U.S. Cl.
CPC .............. *G10L 17/26* (2013.01); *G11B 27/13* (2013.01); *G11B 27/34* (2013.01); *H04N 5/77* (2013.01)

(56) References Cited

U.S. PATENT DOCUMENTS

| | | | |
|---|---|---|---|
| 2010/0091113 A1 | 4/2010 | Morioka et al. | |
| 2012/0020524 A1* | 1/2012 | Ishikawa | H04N 7/183 382/103 |
| 2015/0110471 A1* | 4/2015 | Zheng | H04N 1/00336 386/291 |
| 2015/0147049 A1 | 5/2015 | Eronen et al. | |
| 2016/0217828 A1 | 7/2016 | Rav-Acha et al. | |
| 2017/0025152 A1* | 1/2017 | Jaime | H04N 21/2396 |
| 2017/0034543 A1* | 2/2017 | Gerede | H04N 21/2393 |
| 2017/0251231 A1* | 8/2017 | Fullerton | H04N 21/8547 |
| 2017/0280058 A1* | 9/2017 | Liu | B64D 47/08 |
| 2017/0289444 A1* | 10/2017 | Han | H04N 5/23248 |
| 2018/0181119 A1* | 6/2018 | Lee | G05D 1/0038 |
| 2019/0333397 A1* | 10/2019 | Schupp | B64D 45/00 |

FOREIGN PATENT DOCUMENTS

| | | |
|---|---|---|
| CN | 102693739 A | 9/2012 |
| CN | 103262169 A | 8/2013 |
| CN | 104731944 A | 6/2015 |
| CN | 104811787 A | 7/2015 |
| CN | 104914864 A | 9/2015 |
| CN | 104918005 A | 9/2015 |
| CN | 105120155 A | 12/2015 |
| CN | 105493496 A | 4/2016 |
| CN | 105827959 A | 8/2016 |
| CN | 106131627 A | 11/2016 |
| CN | 107005624 A | 8/2017 |
| CN | 107281709 A | 10/2017 |

OTHER PUBLICATIONS

Min Pan, Video Editing Premiere Software Application Skills, Silicon Valley, Dec. 2010, China.

* cited by examiner

FIG. 4

VIDEO DATA PROCESSING METHOD, DEVICE, SYSTEM, AND STORAGE MEDIUM

CROSS-REFERENCE TO RELATED APPLICATION

This application is a continuation of International Application No. PCT/CN2017/119751, filed on Dec. 29, 2017, the entire content of which is incorporated herein by reference.

TECHNICAL FIELD

The present disclosure relates to the field of electronic technology and, more particularly, to a video data processing method, device and system, and a storage medium.

BACKGROUND

With the development of multimedia technologies, more and more users use video recording to record meaningful moments in their life or work, and store a video file obtained by video recording in local devices, such that the video file can be watched at any time in the future. However, usually the user only pay attention to a part or a few segments of the video file. Therefore, the video file needs to be clipped to obtain the video segments concerned by the user.

In practical application, the video data to be clipped needs to be input into a professional video processing software by a terminal, and a clip length of the video data segment needs to be manually adjusted multiple times to obtain the video data segments that the user is concerned about. It can be seen that the video clipping method described above is complicated to operate and costs time and effort.

SUMMARY

In accordance with the disclosure, there is provided a video data processing method including identifying target video data, determining a target time period of the target video data, clipping a video data segment within the target time period from the target video data, and obtaining clipped video data according to the video data segment. The target time period is set according to shooting state information associated with the target video data. The shooting state information includes at least one of motion state information during shooting of the target video data or state information of a target object detected during shooting of the target video data.

Also in accordance with the disclosure, there is provided a smart device including a processor and a memory storing program instructions that, when executed by the processor, cause the processor to identify target video data, determine a target time period of the target video data, clip a video data segment within the target time period from the target video data, and obtain clipped video data according to the video data segment. The target time period is set according to shooting state information associated with the target video data. The shooting state information includes at least one of motion state information during shooting of the target video data or state information of a target object detected during shooting of the target video data.

BRIEF DESCRIPTION OF THE DRAWINGS

In order to provide a clearer illustration of technical solutions of disclosed embodiments, the drawings used in the description of the disclosed embodiments are briefly described below. It will be appreciated that the described drawings are some rather than all of the drawings of the present disclosure. Other drawings conceived by those having ordinary skills in the art on the basis of the described drawings without inventive efforts should fall within the scope of the present disclosure.

DETAILED DESCRIPTION OF THE EMBODIMENTS

In order to provide a clearer illustration of technical solutions of disclosed embodiments, example embodiments will be described with reference to the accompanying drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

In practice, an effect of clipped video data obtained by clipping video data using the conventional video clipping methods is not very good. The present disclosure provides a video data processing method, device and system, and a storage medium. A target time period of target video data can be set according to shooting state information associated with the target video data, and the video data can be clipped according to the target time period. The target video data may refer to video data to be clipped. The target time period may refer to a time period within which a video data segment is clipped from the target video data.

The shooting state information may include motion state information during shooting of the target video data. A smart device can obtain the motion state information of an aircraft or a gimbal, determine a time period during which the aircraft or gimbal is in a stable state according to the motion state information, set the target time period of the target video data according to the time period during which the aircraft or gimbal is in the stable state, and clip the video data segment within the target time period from the target video data to obtain the clipped video data. When the aircraft or the gimbal is in the stable state, video images of the video data shot by a photographing device arranged at the aircraft can be relatively stable, such that a stability of the obtained video images of the clipped video data can be relatively high, thereby improving an effect of the clipped video data.

The shooting state information may include state information of a target object (e.g., a user) detected during the shooting of the target video data. The smart device can set the target time period of the target video data according to the state information of the target object, and clip the video data segment within the target time period from the target video data to obtain the clipped video data. Because the state information of the target object may include information that the target object is in a specified expression state (e.g., a happy expression), state information that the target object is in a certain sport (e.g., skydiving), information that the target object sends specified voice data (e.g., laugh sound), and the like, the clipped video data may include a video segment in which the target object is in the specified expression state, or in the certain motion state, or sends the specified voice data. As such, the video clipping can be more intelligent, and the clipped video data can be more suitable to the user's preferences.

The state information of the target object detected during the shooting of the target video data may also include time points set by the target object for clipping the target video data. Since the stability of the video images when the target video data starts to be recorded can be poor, the smart device can select, from the set time points of the target object, the time points having time intervals from a start time point of playing the target video data greater than a first preset time interval. If a time interval between a current time point and a previous time point in the selected time points is less than a second preset time interval, it is determined that the time points of the target object are set too frequently. The previous time point can be set as a valid time point, the current time point can be set as an invalid time point, and the target time period of the target video data can be set according to the obtained valid time point. The current time point can refer to a time point of the target video data being processed at a current moment. The video data can be clipped according to the target time period, such that not only the video data having the stable video images can be clipped out, but also erroneous operations, for example, frequently setting the time points of the target object, which may cause the clipped video data being too short to obtain useful information from the clipped video, can be avoided, thereby improving an clipping accuracy of the video data.

The shooting state information may include the state information of the target object detected during the shooting of the target video data. The state information of the target object can include the time points set by the target object for clipping the target video data. The smart device can select the valid time points from the time points set by the target object according to the motion state information during the shooting of the target video data (e.g., the motion state information of the aircraft or gimbal). The target time period of the target video data can be set according to the valid time points, and the video data segment within the target time period can be clipped from the target video data to obtain the clipped video data having more stable video images, thereby improving the clipping accuracy of the video data.

In some embodiments, the aircraft can include a flying device such as an unmanned aerial vehicle (UAV) or a flying robot. The smart device can include a photographing device, or may include a smart terminal having a communication function such as a smart phone, a tablet computer, a smart wearable device, a remote controller, or the like.

In order to better understand the video data processing method, device and system, and the storage medium provided by the present disclosure, the video data processing system will be described below.

Figure 1A:
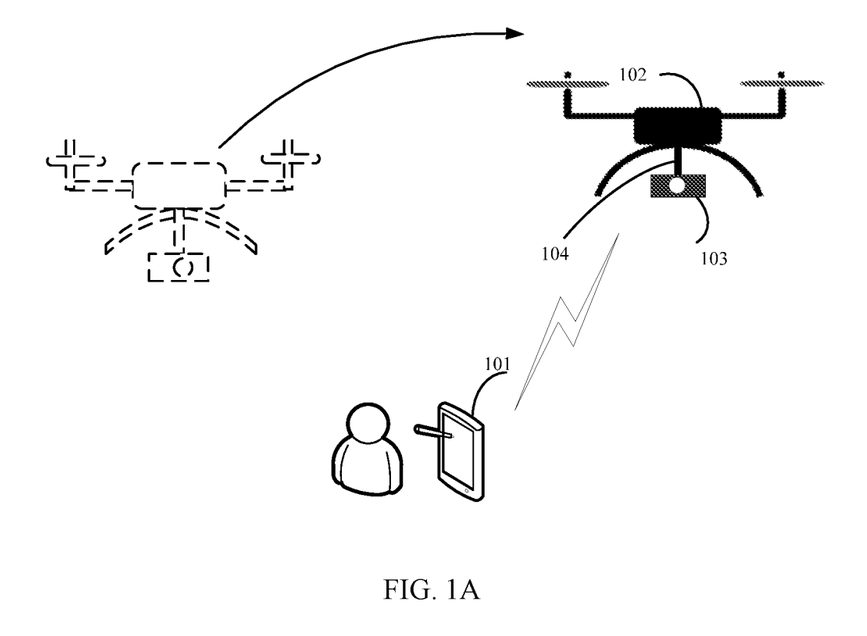
FIG. 1A is a schematic structural diagram of a video data processing system consistent with embodiments of the disclosure.

FIG. 1A is a schematic structural diagram of an example video data processing system consistent with the disclosure. As shown in FIG. 1A, the video data processing system includes a smart device 101, a UAV 102, a photographing device 103, and a gimbal 104 carrying the photographing device 103.

The UAV 102 may include a body of the UAV 102. The body of the UAV 102 can carry the gimbal 104 or another carrier device. The photographing device 103 (e.g., a main camera, a monocular camera, a binocular camera, and/or the like) can be carried by the gimbal 104 or the other carrier device and configured to shoot the video data or image data during the flight of the UAV 102. The UAV 102 may further include a positioning sensor, e.g., a global positioning system (GPS), a barometer, an electronic compass, a compass, and the like, which is not limited here.

The UAV 102 and the smart device 101 can communicate via a network (e.g., a wireless link). The wireless link may include, for example, a cellular mobile data network, a wireless fidelity (Wi-Fi) link, an infrared link, a Bluetooth link, and/or the like, which is not limited here.

The smart device 101 may be stationary or mobile. The smart device 101 may have a remote control function, and can send instructions to the photographing device 103 or the UAV 102. For example, the instructions can be sent to the photographing device 103 to trigger the photographing device 103 to set the time points for clipping the target video data. The smart device 101 can be further configured to set the target time period of the target video data, and clip the target video data according to the target time period.

The photographing device 103 can be further configured to set the target time period of the target video data. In some embodiments, the smart device 101 may be included in the photographing device 103, and the smart device 101 may also be included in another terminal, which is not limited here.

It should be noted that FIG. 1A uses dotted lines and solid lines for the UAV 102 to indicate that the target video data is shot during the flight of the UAV.

In some embodiments, during a process of shooting the target video data using the photographing device 103 on the UAV 102, the smart device 101 can obtain the shooting state information associated with the target video data (e.g., the motion state information during the shooting of the target video data), and clip the video data segment having the more stable video images from the target video data according to the motion state information.

Figure 1B:
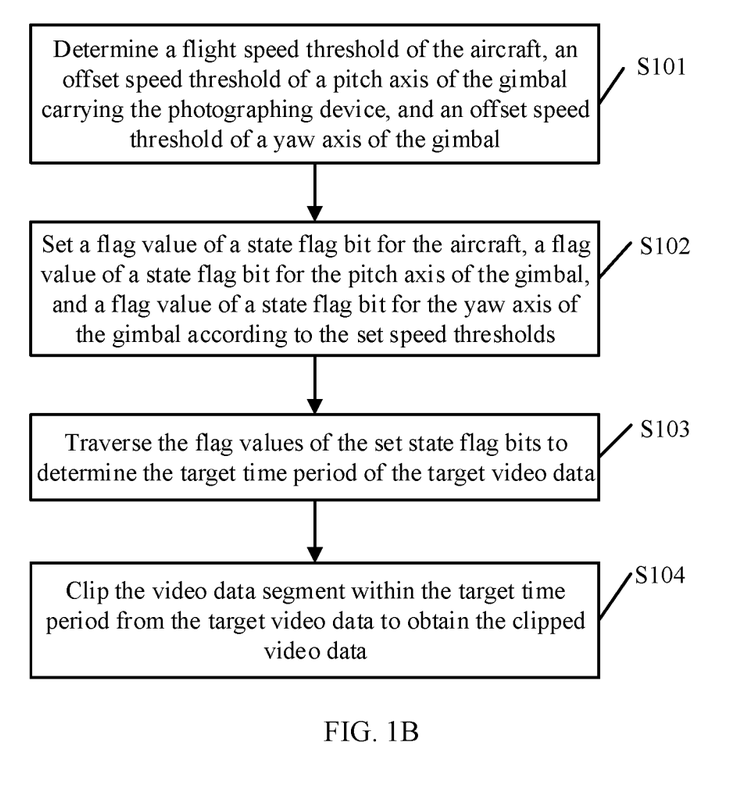
FIG. 1B is a schematic flow chart of a video data processing method consistent with embodiments of the disclosure.

FIG. 1B is a schematic flow chart of an example video data processing method consistent with the disclosure. As shown in FIG. 1B, at S101, a flight speed threshold of the aircraft, an offset speed threshold of a pitch axis of the gimbal carrying the photographing device, and an offset speed threshold of a yaw axis of the gimbal are determined.

The smart device can determine the flight speed threshold of the aircraft through historical flight data of the flight, determine the offset speed thresholds (i.e., the offset speed threshold of the pitch axis and/or the offset speed threshold of the yaw axis) according to historical offset speed data of the gimbal. The flight speed threshold of the aircraft and the offset speed thresholds of the gimbal can be also manually set by the user.

At S102, a flag value of a state flag bit for the aircraft, also referred to as an "aircraft state flag bit," a flag value of a state flag bit for the pitch axis of the gimbal, also referred to as a "gimbal pitch state flag bit," and a flag value of a state flag bit for the yaw axis of the gimbal, also referred to as a "gimbal yaw state flag bit," are set according to the set speed thresholds. The set speed thresholds include the set flight speed threshold of the aircraft and the set offset speed thresholds. The smart device can set the state flag of the aircraft and the state flags of the pitch axis and yaw axis of the gimbal, and set the flag values for the state flags. The flag bits can be used to indicate the motion state information during the shooting of the target video data. For example, if a flight speed of the aircraft is greater than the flight speed threshold, it can be determined that a flight state of the aircraft is in a stable state, and the flag value of the state flag bit of the aircraft can be set as a valid value. If the flight speed of the aircraft is less than or equal to the flight speed threshold, it can be determined that the flight state of the aircraft is in an unstable state, and the flag value of the state flag bit of the aircraft can be set as an invalid value.

If an offset speed of the pitch axis of the gimbal is greater than the offset speed threshold of the pitch axis, it can be determined that an offset state of the pitch axis of the gimbal is in the stable state, and the flag value of the state flag bit of the pitch axis of the gimbal can be set as the valid value. If the offset speed of the pitch axis of the gimbal is less than or equal to the offset speed threshold of the pitch axis, it can be determined that the offset state of the pitch axis of the gimbal is in the unstable state, and the flag value of the state flag bit of the pitch axis of the gimbal can be set as the invalid value.

If an offset speed of the yaw axis of the gimbal is greater than the offset speed threshold of the yaw axis, it can be determined that an offset state of the yaw axis of the gimbal is in the stable state, and the flag value of the state flag bit of the yaw axis of the gimbal can be set as the valid value. If the offset speed of the yaw axis of the gimbal is less than or equal to the offset speed threshold of the yaw axis, it can be determined that the offset state of the yaw axis of the gimbal is in the unstable state, and the flag value of the state flag bit of the yaw axis of the gimbal can be set as the invalid value.

At S103, the flag values of the set state flag bits are traversed to determine the target time period of the target video data. The smart device can traverse the flag value of the state flag bit of the aircraft and the flag values of the state flag bits of the pitch axis and the yaw axis of the gimbal, and determine a start time point and an end time point of the target time period of the target video data according to the traversed flag values.

In some embodiments, the smart device can determine the start time point of the target time period of the target video data according to the traversed flag values. The method can include traversing the flag value of the state flag bit of the aircraft and the flag values of the state flag bits of the pitch axis and yaw axis of the gimbal, and setting the start time point of the target time period of the target video data according to a target moment, in response to that all of the traversed flag values before the target moment are invalid and at least one of the traversed flag values at the target moment becomes the valid value.

If all of the traversed flag values before the target moment are invalid, and at least one of the traversed flag values at the target moment becomes the valid value, then it is determined that the flight state of the aircraft and the offset state of the gimbal at the target moment are in the stable states. The start time point of the target time period of the target video data can be set according to the target moment.

In some embodiments, the smart device can use letters to indicate the flag values of the state flags, for example, YES indicates the valid value, and NO indicates the invalid value. Table 1 shows the traversed flag values before and at the target moment. As shown in Table 1, the flag value of the aircraft at the target moment (e.g., 3:00) traversed by the smart device is YES and the other flag values are NO. All of the traversed flag values before the target moment are NO. The smart device can determine that at least one of the traversed flag values at the target moment is YES, and the traversed flag values before the target moment are all NO. A time point at which the target moment is mapped onto the target video data may be determined according to a mapping relationship between the target moment and the time point in the target video data. The time point obtained by the mapping can be set as the start time point of the target time period of the target video data.

TABLE 1

|  | Flag value before target moment | Flag value at target moment |
| --- | --- | --- |
| Aircraft | NO | YES |
| Pitch axis of gimbal | NO | NO |
| Yaw axis of gimbal | NO | NO |

In some embodiments, determining, by the smart device, the end time point of the target time period of the target video data according to the traversed flag values can include the followings. The flag value of the state flag of the aircraft and the flag values of the state flags of the pitch axis and yaw axis of the gimbal can be traversed. If at least one of the traversed flag values before the target moment is the valid value, and at least one of the traversed flag values at the target moment changes, and at least one of the traversed flag values at the target moment is the valid value, the end time point of the target time period of the target video data can be set according to the target moment, and a start time point of a next target time period of the target video data can be set according to the target moment.

If at least one of the traversed flag values before the target moment is the valid value, and at least one of the traversed flag values at the target moment changes, and at least one of the traversed flag values at the target moment is the valid value, it is determined that there is a slight jitter in the flight state of the aircraft or the offset state of the gimbal at the target moment, i.e., the flight state of the aircraft or the offset state of the gimbal at the target moment is in the unstable state. The end time point of the target time period of the target video data may be set according to the target moment, and the start time point of the next target time period of the target video data may be set according to the target moment.

In some embodiments, the smart device can use letters to indicate the flag values of the state flags, for example, YES indicates the valid value, and NO indicates the invalid value. Table 2 shows the traversed flag values before and at the target moment. As shown in Table 2, the traversed flag value of the aircraft before the target moment is YES and the other traversed flag values before the target moment are NO. The traversed flag value of the aircraft and the traversed flag value of the pitch axis of the gimbal at the target moment are both YES. The smart device can determine that at least one of the traversed flag values before the target moment is YES, and at least one of the traversed flag values at the target moment changes (e.g., the flag value of the pitch axis of the gimbal changes), and at least one of the traversed flag values at the target moment is the valid value. Then the video data processing device may determine the time point at which the target moment is mapped onto the target video data according to the mapping relationship between the target moment and the time point in the target video data. The time point obtained by the mapping can be set as the end time point of the target time period of the target video data.

TABLE 2

|  | Flag values before target moment | Flag values at target moment |
|---|---|---|
| Aircraft | YES | YES |
| Pitch axis of gimbal | NO | YES |
| Yaw axis of gimbal | NO | NO |

In some embodiments, determining, by the smart device, the end time point of the target time period of the target video data according to the traversed flag values can include the followings. The flag value of the state flag of the aircraft and the flag values of the state flags of the pitch axis and yaw axis of the gimbal can be traversed. If at least one of the traversed flag values before the target moment is the valid value, and at least one of the traversed flag values at the target moment changes, and all of the traversed flag values at the target moment are the invalid values, the end time point of the target time period of the target video data can be set according to the target moment.

If at least one of the traversed flag values before the target moment is the valid value, and at least one of the traversed flag values at the target moment changes, and all of the traversed flag values at the target moment are the invalid values, it is determined that the flight state of the aircraft or the offset state of the gimbal at the target moment has a large jitter, i.e., the flight state of the aircraft or the offset state of the gimbal at the target moment can be in the unstable states, and the end time point of the target time period of the target video data may be set according to the target moment.

In some embodiments, the smart device can use letters to indicate the flag values of the state flags, for example, YES indicates the valid value, and NO indicates the invalid value. Table 3 shows the traversed flag values before and at the target moment. As shown in Table 3, the traversed flag value of the aircraft and the traversed flag value of the pitch axis of the gimbal before the target moment are YES, the other flag value is NO, and all of the traversed flag values at the target moment are NO. The smart device can determine that at least one of the traversed flag values before the target moment is the valid value, and at least one of the traversed flag values at the target moment changes (e.g., the flag value of the aircraft and the flag value of the pitch axis of the gimbal change), and all of the traversed flag values at the target moment are the invalid values. Thus, the end time point of the target time period of the target video data can be set according to the target moment.

TABLE 3

|  | Flags value before target moment | Flags value at target moment |
|---|---|---|
| Aircraft | YES | NO |
| Pitch axis of gimbal | YES | NO |
| Yaw axis of gimbal | NO | NO |

At S104, the video data segment within the target time period is clipped from the target video data to obtain the clipped video data. The smart device can traverse the target time period described above. If a duration of the target time period is less than a specified time threshold, the target time period can be set as an invalid time period, thereby avoiding that the clipped video data segment is too short to obtain the useful information from the clipped video data. If the duration of the target time period is greater than a preset duration threshold, the video data segment within a time period corresponding to the preset duration threshold can be clipped from the video data segment of target time period, and the obtained video segment can be used as the clipped video data. It can avoid that the clipped video data segment is too long and the clipped video data includes meaningless information, such that the clipping accuracy of the video data can be improved.

For example, the smart device can set the specified duration threshold to be 6 s, and set the preset duration threshold to be 20 s. If the duration of the target time period of the target video data is 3 s, the smart device can determine that the duration of the target time period is less than the specified duration threshold, then the target time period can be set as the invalid period, i.e., the target time period can be discarded. If the duration of the target time period of the target video data is 25 s, the smart device can determine that the duration of the target time period is greater than the preset duration threshold, then the video data segment of the first 20 s from the video data segment of the target time period can be clipped, and the obtained video segment can be used as the clipped video data.

Consistent with the disclosure, the smart device can obtain the target time period of the target video data according to the flight speed of the aircraft and the offset speed of the gimbal. That is, the target time period can refer to a time period when the flight state of the aircraft and the offset state of the gimbal are in the stable states. When the flight state of the aircraft and the offset state of the gimbal are in the stable states, the effect of the video data obtained by shooting can be better, i.e., the stability of the video images of the video data can be higher. Therefore, the video data segment within the target time period can be clipped from the target video data, and the clipped video data can be obtained according to the clipped video data segment, which can improve the clipping accuracy of the video data and cause the video images of the clipped video data to be more stable.

Figure 2:
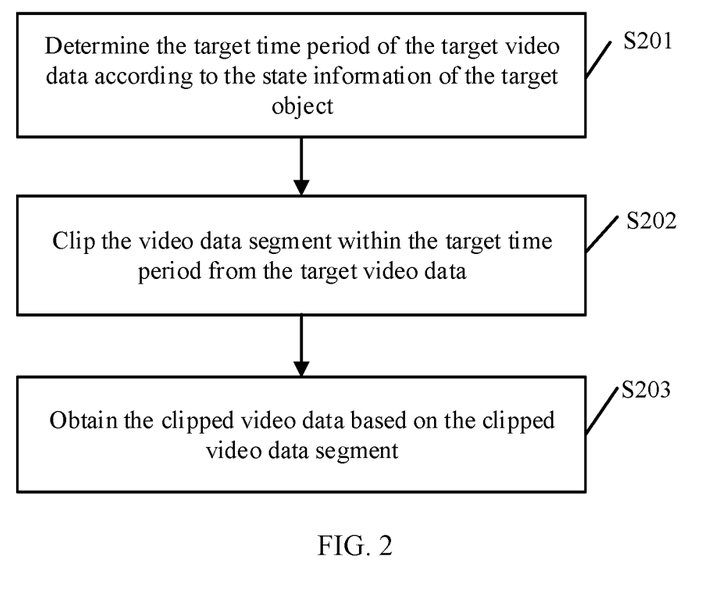
FIG. 2 is a schematic flow chart of another video data processing method consistent with embodiments of the disclosure.

In some embodiments, during the process of shooting the target video data, the smart device can obtain the shooting state information associated with the target video data (e.g., the state information of the target object detected during the shooting of the target video data), and clip the video data segment from the target video data according to the state information of the target object. FIG. 2 is a schematic flow chart of another example video data processing method consistent with the disclosure. As shown in FIG. 2, at S201, the target time period of the target video data is determined according to the state information of the target object.

The state information of the target object may include expression data, voice data, or motion data of the target object. The smart device may determine the target time period of the target video data according to the state information of the target object to obtain the target time period in which the target object is in a specified facial expression, utters a specified voice, or in a specified motion state.

In some embodiments, the state information of the target object can include the expression data of the target object. Determining, by the smart device, the target time period of the target video data according to the state information of the target object can include: performing face recognition on the target object detected during the shooting of the target video data to obtain the expression data of the target object, and setting the target time period of the target video data according to the expression data of the target object.

The smart device can perform the face recognition on the target object detected during the shooting of the target video data to obtain the expression data of the target object. According to the expression data of the target object, a time period when the target object is in the specified expression can be determined, and the target time period of the target video data can be set according to the time period when the target object is in the specified expression.

In some embodiments, the specified expression can include a happy expression or a negative expression. The smart device can perform the face recognition on the images in the target video data to obtain the expression data of the target object. The time period during which the target object is in the happy expression or the negative expression can be determined according to the expression data of the target object, and the target time period for the target video data can be set according to the time period during which the target object is in the happy expression or the negative expression.

In some embodiments, the state information of the target object can include physiological characteristic data of the target object. Determining, by the smart device, the target time period of the target video data according to the state information of the target object can include: determining heart rate information of the target object according to the physiological characteristic data of the target object, and setting the target time period of the target video data according to the heart rate information of the target object.

The smart device can determine, according to the heart rate information of the target object, a time point at which a heart rate value of the target object increases to a preset heart rate value and a time point at which the heart rate value decreases to the preset heart rate value. The target time period of the target video data can be set according to the time point when the heart rate value increases to the preset heart rate value and the time point when the heart rate value decreases to the preset heart rate value. Since the target object is in a special psychological state (e.g., an excited psychological state), the heart rate value of the target object can be relatively high. Therefore, the target time period can be set according to the heart rate information of the target object, and the target video data can be clipped according to the target time period, thereby obtaining the video data of the target object in the special psychological state, and causing the clipping of the video data to be more intelligent.

In some embodiments, the state information of the target object can include the voice data of the target object. Determining, by the smart device, the target time period of the target video data according to the state information of the target object can include: obtaining the voice data of the target object, identifying key information in the voice data of the target object, and setting the target time period of the target video data according to the key information.

The smart device can extract an audio track from the target video data, obtain the voice data of the target object according to the audio track of the target video data, and identify the key information in the voice data of the target object. The key information may include the specified voice (e.g., an exclamation or laughter) uttered by the target object. The target time period of the target video data can be set according to the time period when the specified voice appears. In some embodiments, a time period when the target object is in a speech or singing scene can be determined according to an intonation, and the target time period of the target video data can be set according to a start time and an end time of the speech or singing of the target object, such that the video data corresponding to the target object uttering the specified voice or in the specified scene can be obtained.

In some embodiments, the state information of the target object can include the time points set for clipping the target video data. Determining, by the smart device, the target time period of the target video data according to the state information of the target object can include: receiving a touch command of the target object for the target video data, the touch command carrying the time points set for clipping the target video data, and determining the target time period of the target video data according to the time points set for clipping the target video data.

The smart device can set the target time period of the target video data according to the time points set by the target object, such that the video data segment desired by the user can be obtained.

In some embodiments, the time points having the time intervals from the start time point of playing the target video data greater than the first preset time interval can be selected from the time points set by the target object. If the time interval between the current time point and the previous time point in the selected time points is less than the second preset time interval, the previous time point can be set as the valid time point. The current time point can include any time point other than the first time point in the selected time points, and the target time period of the target video data can be set according to the obtained valid time point.

Since the stability of the video images at the start of recording of the target video data can be poor, the time points having the time intervals from the start time point of playing the target video data greater than the first preset time interval can be selected from the time points set by the target object. If the time interval between the current time point and the previous time point in the selected time points is less than the second preset time interval, it can be determined that the target object sets the time points of the target object too frequently, and hence, the previous time point can be set as the valid time point and the current time point can be set as the invalid time point. The target time period of the target video data can be set according to the obtained valid time point, such that not only the video data having the stable video images can be clipped out, but also erroneous operations, for example, frequently setting the time points of the target object, which may cause the clipped video data being too short to obtain useful information from the clipped video, can be avoided thereby improving the clipping accuracy of the video data.

For example, if the first preset time interval is 6 s and the second preset time interval is 20 s, the smart device can receive the touch commands sent by the target object through a remote control of the smart device, such as detecting touch operations for the c1, c2, or Fn key in the remote control. The time points of the touch operations on the key of the remote control can be used as the time points set by the target object for clipping the target video data, and the time points set by the target object for clipping the target video data can include 10 s, 15 s, 35 s, and the like, in the time points of playing the target video data. The smart device can select the time points having the time intervals from the start time point of playing the target video data greater than 6 s from the time points set by the target object. The selected time points can include 10 s, 15 s, 35 s, and the like, in the time points of playing the target video data. If the current time point is 15 s, since the time interval between the previous time point 10 s and the current time point 15 s is less than 20 s, the current time point can be set as the invalid time point (i.e., the current time point can be deleted), and the previous time point 10 s can be set as the effective time point. If the current time point is 35 s, since the time interval between the last time point 10 s and the current time point 15 s is greater than 20 s, so the current time point 10 s and the previous time point 35 s can be set as the valid time points. A time period from the 10 s to the 35 s can be set as the target time period of the target video data.

In some embodiments, the smart device can select the effective time point from the time points set by the target object for clipping the target video data according to the motion state information during the shooting of the target video data (e.g., the flight speed information of the aircraft or the offset speed information of the gimbal). The target time period of the target video data can be set according to the selected valid time points, such that the target time period when the target video data has the relatively stable video images can be obtained.

At S202, the video data segment within the target time period is clipped from the target video data. For example, if the target time period is 10 s to 35 s, the smart device can clip the video segment within the 10 s to 35 s time period from the target video data.

At S203, the clipped video data is obtained based on the clipped video data segment. If there are multiple video data segments obtained by clipping, the smart device can synthesize the video data segments obtained by clipping according to a shooting time sequence to obtain the clipped video data. The multiple video data segments can also be treated as multiple clipped video data and can be stored. If the number of video data segments obtained by clipping is only one, the clipped video data segment can be used as the clipped video data.

In some embodiments, the smart device can process the clipped video data segments (e.g., add special effects or noise reduction processing and the like) to obtain the clipped video data to improve a playback effect of the video data. The smart device consistent with the disclosure may be arranged in the photographing device, and the photographing device may include a movable camera or a still camera, which is not limited here.

Consistent with the disclosure, the data processing device can determine the target time period of the target video data according to the state information of the target object detected during the shooting of the target video data. The target time period can refer to the time period when the target object is in the specific expression or the target object utters the specific voice. The video data segment within the target time period can be clipped from the target video data to obtain the clipped video data, and wonderful video data can be include in the clipped video data, such that the clipped video data can be more in line with the user's preference.

Figure 3:
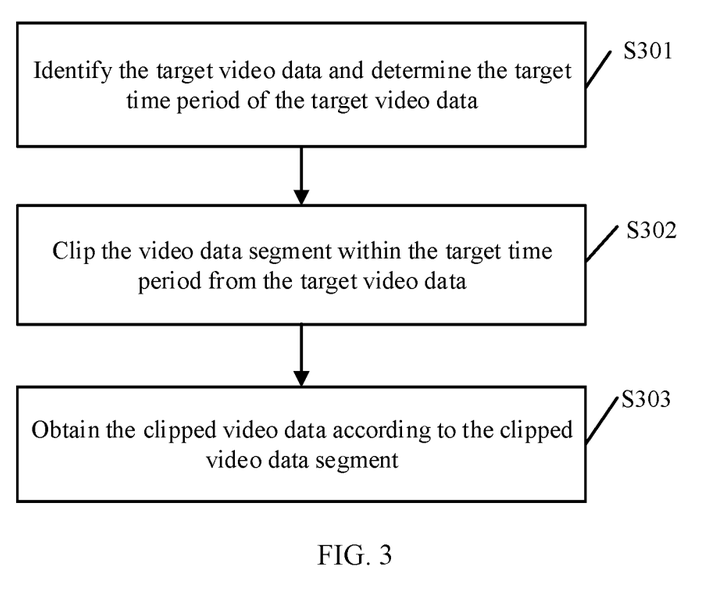
FIG. 3 is a schematic flow chart of another video data processing method consistent with embodiments of the disclosure.

Based on the video data processing method described above, FIG. 3 is a schematic flow chart of another example video data processing method consistent with the disclosure. As shown in FIG. 3, at S301, the target video data is identified, and the target time period of the target video data is determined.

In some embodiments, the target time period can be set according to the shooting state information associated with the target video data. The shooting state information can include the motion state information during shooting of the target video data, and/or the state information of the target object detected during shooting of the target video data.

If the target time period is not set for the target video data, the smart device can identify the target video data according to the shooting state information associated with the target video data, and set a target segment for the target video data to obtain a target time segment for the target video data. If the target time period has been set for the target video data, the smart device can directly identify the target video data to determine the target time period of the target video data.

It should be noted that the target time period of the target video data may refer to the target time period set by the photographing device during the shooting of the target video data, or set by the smart device after the shooting of the target video data is completed, which is not limited here.

In some embodiments, the target video data can be shot by the photographing device arranged at the aircraft, and the smart device can obtain the motion state information of the target video data shot by the aircraft during the flight, and set the target time period of target video data shot by the photographing device according to the motion state information.

In some embodiments, the motion state information can include an acceleration of the aircraft. If the acceleration of the aircraft is less than a first preset acceleration threshold, it is determined that the flight speed of the aircraft does not change much, i.e., the body of the aircraft has no large jitter. Therefore, the images of the obtained video data segment at this moment can be relatively stable. Therefore, the smart device may set the target time period of the target video data according to a time period when the flight acceleration of the aircraft is less than the first preset acceleration threshold, and the target time period can refer to a time period when the video image of the target video data is relatively stable, thereby improving the effect of the clipped video data.

In some embodiments, the motion state information can include an offset acceleration of the gimbal. If the offset acceleration of the gimbal is less than a second preset speed threshold, it can be determined that a tilt angle of the gimbal is not large, and the images of the video data segment obtained at this moment can be relatively stable. Therefore, the smart device can set the target time period of the target video data according to a time period during which the offset acceleration of the gimbal is less than the second preset acceleration threshold, and the target time period can refer to the time period when the video image of the target video data is relatively stable, such that the effect of the clipped video data can be improved.

It should be noted that the first preset acceleration threshold may be set according to a relationship between the acceleration of the aircraft and the jitter of the body, and the second preset acceleration threshold may be set according to a relationship between the offset acceleration of the gimbal and the tilt angle.

In some embodiments, the motion state information during the shooting of the target video data can include navigation information of the aircraft. The smart device can determine a time point when the aircraft reaches a target area, also referred to as a "reaching time point," and a time point when the aircraft leaves the target area, also referred to as a "leaving time point," based on the navigation information of the aircraft. The target time period of the target video data can be set according to the time points when the aircraft reaches the target area and leaves the target area.

The smart device can receive the navigation information of the target video data during the shooting process sent by the aircraft, and determine the time point when the aircraft reaches the target area and the time point when the aircraft leaves the target area based on the navigation information. The target time period of the target video data can be set according to the time points when the aircraft reaches the target area and leaves the target area, such that the video data of the target area can be obtained according to the target time period.

In some embodiments, the shooting state information can also include ambient light information during shooting of the target video data. The data processing device can obtain the ambient light information during the shooting of the target video data and set the target time period of the target video data shot by the photographing device according to the ambient light information.

The smart device can obtain the ambient light information during the shooting of the target video data through a light sensor, and determine a time point when an ambient light value increases to a preset light value and a time point when the ambient light value decreases to the preset light value according to the ambient light information. The target time period of the target video data obtained by the photographing device can be set according to the time point when the ambient light value increases to the preset light value and the time point when the light value decreases to the preset light value. Since the ambient light value is greater than the preset light value, the effect of the shot video data can be better, such that the target time period can refer to a time period with better ambient light. Therefore, the video data having better effects can be clip from the target video data according to the target time period, and the effect of the clipped video data can be improved.

In some embodiments, the motion state information during shooting of the target video data can include the motion state information of the photographing device that shoots the target video data. A three-dimensional acceleration of the photographing device can be obtained. The motion state information of the photographing device can be determined according to the three-dimensional acceleration of the photographing device, and the target time period of the target video data can be set according to the motion state information of the photographing device.

The smart device can obtain the three-dimensional acceleration of the photographing device through an inertial measurement unit (IMU) of the photographing device, and determine the motion state information of the photographing device according to the three-dimensional acceleration of the photographing device. If according to the motion state information, it is determined that the photographing device is in an accelerated ascent, accelerated descent, or accelerated movement state, it can be determined that the target object (e.g., the user) carrying the photographing device is also in the accelerated ascent, accelerated fall, or accelerated movement state. The target time period of the target video data can be set according to the time period in which the photographing device is in the state of accelerated ascent, accelerated descent, or accelerated movement, such that the video data of the user in the specified motion state (e.g., skydiving) can be obtained, and the clipped video data can be more suitable for the user's preferences.

In some embodiments, when the target object carries the photographing device to shoot the target video data, the smart device can obtain the three-dimensional acceleration of the photographing device (e.g., the acceleration of the X or Y or Z axis). If the accelerations of the three axes are greater than a preset acceleration threshold, or the acceleration of at least one axis is greater than the preset acceleration threshold, the smart device can determine that the target object is in a rapid motion state such as bungee jumping, skydiving, and skiing. The time period when the acceleration of the three axes is greater than the preset acceleration threshold can be obtained, and the target time period of the target video data can be set according to the obtained time period, such that the video data of the target object in the specified motion state can be obtained, and the effect of the clipped video data can be improved.

In some embodiments, after the smart device sets the target time period for the target video data, the video data segment within the target time period can be displayed in a prominent manner (e.g., a highlight manner) too remind the user that the highlighted video data segment is the video data to be clipped. If a touch operation is detected on the highlighted video data segment, the smart device can jump to the highlighted video data segment and play the video data segment.

At S302, the video data segment within the target time period is clipped from the target video data. The smart device can clip the video data segment within the target time period from the target video to obtain the clipped video data segment.

At S303, the clipped video data is obtained according to the clipped video data segment. If there are multiple video data segments obtained by clipping, the smart device can synthesize the video data segments obtained by clipping according to the shooting time sequence to obtain the clipped video data. The multiple video data segments can also be treated as multiple clipped video data and can be stored. If the number of video data segments obtained by clipping is only one, the clipped video data segment can be used as the clipped video data.

Consistent with the disclosure, the clipped video data can be obtained through clip the video data segment within the target time period from the target video data. Since the target time period can be set according to the shooting state information associated with the target video data, and the shooting state information can include the motion state information during shooting, the video data shot by the photographing device when the motion state (e.g., the motion state of the aircraft or the gimbal) is stable can be obtained by clipping. As such, the video images of the video data obtained by clipping can be more stable. The shooting state information can include the state information of the target object detected during shooting, and the video data when the target object is in the specified state can be obtained by clipping. As such, the video clipping can be more intelligent, the clipped video data can be more suitable to the user's preferences, and the effect of the clipped video data can be improved.

Figure 4:
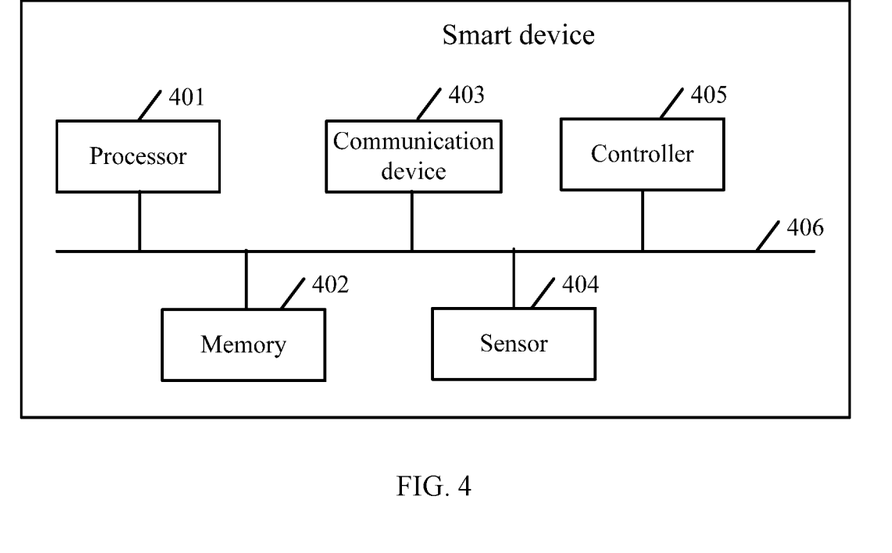
FIG. 4 is a schematic structural diagram of a smart device consistent with embodiments of the disclosure.

FIG. 4 is a schematic structural diagram of an example smart device consistent with the disclosure. As shown in FIG. 4, the smart device includes at least one processor 401, for example, a central processing unit (CPU), at least one memory 402, a communication device 403, a sensor 404, and a controller 405. The at least one processor 401, the at least one memory 402, the communication device 403, the sensor 404, and the controller 405 are coupled to each other via a bus 406.

The communication device 403 may be configured to receive the flight status information of the aircraft or the video data shot by the photographing device during the flight of the aircraft. The sensor 404 can be configured to obtain the ambient light, or the position information and the motion information of the smart device. The memory 402 can be configured to store program instructions, and the processor 401 can be configured to call the program instructions stored in the memory 402.

In some embodiments, the processor 401 can be configured to call the program instructions stored in the memory 402 to perform a method consistent with the disclosure, such as one of the above-described example methods. In some embodiments, the processor 401 can identify the target video data and determine the target time period of the target video data, clip the video data segment within the target time period from the target video data, and obtain the clipped video data according to the clipped video data segment.

The target time period can be set according to the shooting state information associated with the target video data. The shooting state information can include the motion state information during shooting of the target video data, and/or the state information of the target object detected during shooting of the target video data.

In some embodiments, the target video data can be shot by the photographing device arranged at the aircraft. The processor 401 can be further configured to call the program instructions stored in the memory 402 to obtain the motion state information of the target video data shot by the aircraft during the flight, and set the target time period of target video data shot by the photographing device according to the motion state information.

In some embodiments, the motion state information during shooting of the target video data can be represented by the flag values of preset flag bits. The preset flag bits can include the state flag bit of the aircraft and/or the state flag bits of the gimbal carrying the photographing device. The state flag bits of the gimbal can include at least one of the state flag bit of the pitch axis and the state flag bit of the yaw axis.

The state flag bit of the aircraft can be determined according to the flight speed information of the aircraft. The state flag bits of the gimbal can be determined according to the offset speed information of the gimbal.

In some embodiments, the processor 401 can be further configured to call the program instructions stored in the memory 402 to set the start time point and the end time point of the target time period of the target video data shot by the photographing device according to the flag values of the preset flag bits.

In some embodiments, the processor 401 can be further configured to call the program instructions stored in the memory 402 to traverse the flag value of the state flag bit of the aircraft and the flag values of the state flag bits of the pitch axis and the yaw axis of the gimbal, and set the start time point of the target time period of the target video data according to the target moment, in response to that all of the traversed flag values before the target moment are invalid and at least one of the traversed flag values at the target moment becomes the valid value.

In some embodiments, the processor 401 can be further configured to call the program instructions stored in the memory 402 to traverse the flag value of the state flag of the aircraft and the flag values of the state flags of the pitch axis and yaw axis of the gimbal, and, if at least one of the traversed flag values before the target moment is the valid value, at least one of the traversed flag values at the target moment changes, and at least one of the traversed flag values at the target moment is the valid value, set the end time point of the target time period of the target video data according to the target moment and set the start time point of the next target time period of the target video data according to the target moment.

In some embodiments, the processor 401 can be further configured to call the program instructions stored in the memory 402 to traverse the flag value of the state flag of the aircraft and the flag values of the state flags of the pitch axis and yaw axis of the gimbal, and if at least one of the traversed flag values before the target moment is the valid value, at least one of the traversed flag values at the target moment changes, and all of the traversed flag values at the target moment are the invalid values, set the end time point of the target time period of the target video data according to the target moment.

In some embodiments, the motion state information during the shooting of the target video data can include the navigation information of the aircraft. The processor 401 can be further configured to call the program instructions stored in the memory 402 to determine the time point when the aircraft reaches the target area and the time point when the aircraft leaves the target area based on the navigation information of the aircraft, and set the target time period of the target video data according to the time points when the aircraft reaches the target area and leaves the target area.

In some embodiments, the motion state information during shooting of the target video data can include the motion state information of the photographing device that shoots the target video data. The processor 401 can be configured to call the program instructions stored in the memory 402 to further perform the following processes. The three-dimensional acceleration of the photographing device can be obtained. The motion state information of the photographing device can be determined according to the three-dimensional acceleration of the photographing device, and the target time period of the target video data can be set according to the motion state information of the photographing device.

In some embodiments, the state information of the target object can include the physiological characteristic data of the target object. The processor 401 can be further configured to call the program instructions stored in the memory 402 to determine the heart rate information of the target object according to the physiological characteristic data of the target object, and set the target time period of the target video data according to the heart rate information of the target object.

In some embodiments, the shooting state information can include the state information of the target object detected during shooting of the target video data, and the state information of the target object can include the expression data of the target object. The processor 401 can be further configured to call the program instructions stored in the memory 402 to perform the face recognition on the target object detected during the shooting of the target video data to obtain the expression data of the target object, and set the target time period of the target video data according to the expression data of the target object.

In some embodiments, the shooting state information can include the state information of the target object detected during shooting of the target video data, and the state information of the target object can include the voice data of the target object. The processor 401 can be further configured to call the program instructions stored in the memory 402 to obtain the voice data of the target object, identify the key information in the voice data of the target object, and set the target time period of the target video data according to the key information.

In some embodiments, the state information of the target object can include the time points set for clipping the target video data. The processor 401 can be further configured to call the program instructions stored in the memory 402 to receive the touch command of the target object for the target video data that carries the time points set for clipping the target video data, and determine the target time period of the target video data according to the time points set for clipping the target video data.

In some embodiments, the state information of the target object can include the time points set for clipping the target video data. The processor 401 can be further configured to call the program instructions stored in the memory 402 to select the time points having the time intervals from the start time point of playing the target video data greater than the first preset time interval from the time points set by the target object, and, if the time interval between the current time point and the previous time point in the selected time points is less than the second preset time interval, set the previous time point as the valid time point. The current time point can include any time point other than the first time point in the selected time points, and the target time period of the target video data can be set according to the obtained valid time point.

In some embodiments, the shooting state information can include the motion state information during shooting of the target video data and the state information of the target object detected during shooting of the target video data. The state information of the target object can include the time points set for clipping the target video data. The processor 401 can be further configured to call the program instructions stored in the memory 402 to select the valid time points from the time points set by the target object according to the motion state information, and set the target time period of the target video data according to the valid time points.

In some embodiments, the shooting state information can also include the ambient light information during shooting of the target video data. The processor 401 can be further configured to call the program instructions stored in the memory 402 to obtain the ambient light information during the shooting of the target video data and set the target time period of the target video data shot by the photographing device according to the ambient light information.

In some embodiments, the processor 401 can be configured to call the program instructions stored in the memory 402 to, if the duration of the target time period is greater than the preset duration threshold, clip the video data segment within the time period corresponding to the preset duration threshold from the video data segment of target time period.

The preset disclosure further provides a computer program product. The computer program product can include a non-transitory computer-readable storage medium storing a computer program. The computer program can be executed to cause the computer to perform the processes of the video data processing methods consistent with the disclosure, for example the methods in FIGS. 1B, 2, and 3 described above. The implementation methods and beneficial effects of the computer program product for solving the problem are similar to the implementation methods and beneficial effects of the video data processing methods in FIGS. 1B, 2 and 3, and detailed description thereof is omitted herein.

For the sake of simplicity, the disclosed embodiments are described as a series of action combinations. However, it can be appreciated by those skilled in the art that the described sequence of actions is not intended to limit the present disclosure. According to the present disclosure, certain processes may be performed in other orders or simultaneously. It can be appreciated by those skilled in the art that the embodiments described in the specification are all preferred embodiments, and the involved actions and modules are not necessarily required by the present disclosure.

It can be understood by those of ordinary skill in the art that all or some of the processes in the methods of the present disclosure may be realized by a program instructing related hardware. The program may be stored in a computer-readable storage medium, and the storage medium may include a flash disk, a read-only memory (ROM), a random access memory (RAM), a magnetic disk, an optical disk, or the like.

It is intended that the embodiments disclosed herein are some of the embodiments of the present disclosure and not to limit the scope of the disclosure. Changes, modifications, alterations, and variations of the above-described embodiments may be made by those skilled in the art within the scope of the disclosure.

What is claimed is:

1. A video data processing method comprising:
identifying, by a processor, target video data;
obtaining, by the processor, motion state information during shooting of the target video data including motion state information of at least one of an aircraft, a gimbal, or a photographing device arranged at the aircraft or the gimbal, the motion state information including navigation information of the aircraft;
setting, by the processor, a target time period of the target video data according to the motion state information, including:
determining a reaching time point at which the aircraft reaches a target area and a leaving time point at which the aircraft leaves the target area based on the navigation information of the aircraft; and
setting the target time period according to the reaching time point and the leaving time point;
clipping, by the processor, a video data segment within the target time period from the target video data; and
obtaining, by the processor, clipped video data according to the video data segment.

2. The method of claim 1, wherein:
the motion state information further includes flag values of one or more preset flag bits, the one or more preset flag bits including at least one of:
an aircraft state flag bit for the aircraft determined according to flight speed information of the aircraft,
a gimbal pitch state flag bit for a pitch axis of a gimbal carrying the photographing device, the gimbal pitch state flag bit being determined according to offset speed information of the gimbal along the pitch axis, or
a gimbal yaw state flag bit for a yaw axis of the gimbal, the gimbal yaw state flag bit being determined according to offset speed information of the gimbal along the yaw axis; and
setting the target time period of the target video data according to the motion state information further includes setting a start time point and an end time point of the target time period according to the flag values of the one or more preset flag bits.

3. The method of claim 2, wherein setting the start time point of the target time period includes:
traversing the flag values of the aircraft state flag bit, the gimbal pitch state flag bit, and the gimbal yaw state flag bit; and
setting the start time point of the target time period according to a target moment, in response to all of the flag values before the target moment being invalid and at least one of the flag values at the target moment becoming valid.

4. The method of claim 2, wherein setting the end time point of the target time period includes:
traversing the flag values of the aircraft state flag, the gimbal pitch state flag bit, and the gimbal yaw state flag bit; and in response to at least one of the flag values before a target moment being valid, at least one of the flag values at the target moment having changed, and at least one of the flag values at the target moment being valid:
setting the end time point of the target time period according to the target moment; and
setting a start time point of a next target time period of the target video data according to the target moment.

5. The method of claim 2, wherein setting the end time point of the target time period includes:
traversing the flag values of the aircraft state flag, the gimbal pitch state flag bit, and the gimbal yaw state flag bit; and
setting the end time point of the target time period of the target video data according to a target moment, in response to at least one of the flag values before the target moment being valid, at least one of the flag values at the target moment having changed, and all of the flag values at the target moment being invalid.

6. The method of claim 1, further comprising:
obtaining a three-dimensional acceleration of the photographing device;
determining the motion state information of the photographing device according to the three-dimensional acceleration of the photographing device; and
setting the target time period according to the motion state information of the photographing device.

7. The method of claim 1, further comprising:
obtaining state information of a target object including physiological characteristic data of the target object;
determining heart rate information of the target object according to the physiological characteristic data; and
setting the target time period according to the heart rate information of the target object.

8. The method of claim 1, further comprising:
performing face recognition on a target object to obtain expression data of the target object; and
setting the target time period according to the expression data of the target object.

9. The method of claim 1, further comprising:
obtaining voice data of a target object;
identifying key information in the voice data of the target object; and
setting the target time period according to the key information.

10. The method of claim 1, further comprising:
receiving a touch command from a target object regarding the target video data, the touch command carrying time points set for clipping the target video data; and
determining the target time period according to the time points set for clipping the target video data.

11. The method of claim 1, further comprising:
obtaining time points set by a target object for clipping the target video data;
selecting, from the time points set by the target object, time points having time intervals from a start time point of playing the target video data greater than a first preset time interval;
in response to the time interval between a current time point and a previous time point in the selected time points being less than a second preset time interval, setting the previous time point as a valid time point, the current time point including any of the selected time point other than a first time point in the selected time points; and
setting the target time period of the target video data according to the valid time point.

12. The method of claim 1, further comprising:
obtaining time points set by a target object for clipping the target video data;
selecting one or more valid time points from the time points set by the target object according to the motion state information; and
setting the target time period according to the one or more valid time points.

13. The method of claim 1, further comprising:
obtaining ambient light information during the shooting of the target video data; and
setting the target time period according to the ambient light information.

14. The method of claim 1, wherein clipping the video data segment within the target time period from the target video data includes, in response to a duration of the target time period being greater than a preset duration threshold, clipping a video data segment within a time period corresponding to the preset duration threshold from the video data segment of the target time period.

15. A smart device comprising:
a processor; and
a memory coupled to the processor and storing program instructions that, when being executed by the processor, cause the processor to:
identify target video data;
obtain motion state information during shooting of the target video data including motion state information of at least one of an aircraft, a gimbal, or a photographing device arranged at the aircraft or the gimbal, the motion state information including navigation information of the aircraft;
set a target time period of the target video data according to the motion state information, including:
determining a reaching time point at which the aircraft reaches a target area and a leaving time point at which the aircraft leaves the target area based on the navigation information of the aircraft; and
setting the target time period according to the reaching time point and the leaving time point;
clip a video data segment within the target time period from the target video data; and
obtain clipped video data according to the video data segment.

16. The device of claim 15, wherein:
the motion state information further includes flag values of one or more preset flag bits, the one or more preset flag bits including at least one of:
an aircraft state flag bit for the aircraft determined according to flight speed information of the aircraft,
a gimbal pitch state flag bit for a pitch axis of a gimbal carrying the photographing device, the gimbal pitch state flag bit being determined according to offset speed information of the gimbal along the pitch axis, or
a gimbal yaw state flag bit for a yaw axis of the gimbal, the gimbal yaw state flag bit being determined according to offset speed information of the gimbal along the yaw axis; and
the program instructions further cause the processor to set the target time period of the target video data according to the motion state information further includes setting a start time point and an end time point of the target time period according to the flag values of the one or more preset flag bits.

17. The device of claim 16, wherein the program instructions further cause the processor to:
- traverse the flag values of the aircraft state flag bit, the gimbal pitch state flag bit, and the gimbal yaw state flag bit;
- in response to all of the flag values before a target moment being invalid and at least one of the flag values at the target moment becoming valid, set the start time point of the target time period according to the target moment;
- in response to at least one of the flag values before the target moment being valid, at least one of the flag values at the target moment having changed, and all of the flag values at the target moment being invalid, set the end time point of the target time period of the target video data according to the target moment; and
- in response to at least one of the flag values before the target moment being valid, at least one of the flag values at the target moment having changed, and at least one of the flag values at the target moment being valid:
  - setting the end time point of the target time period according to the target moment; and
  - setting a start time point of a next target time period of the target video data according to the target moment.

* * * * *